Figure 4:
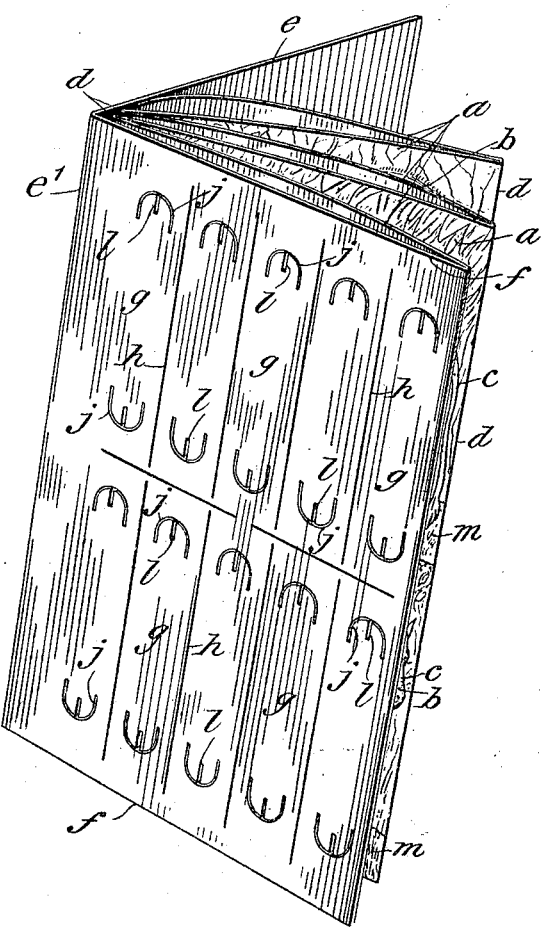

G. TUCK.
TOY OR PICTURE BOOK.
APPLICATION FILED JAN. 9, 1909.
959,655.
Patented May 31, 1910.
2 SHEETS—SHEET 1.
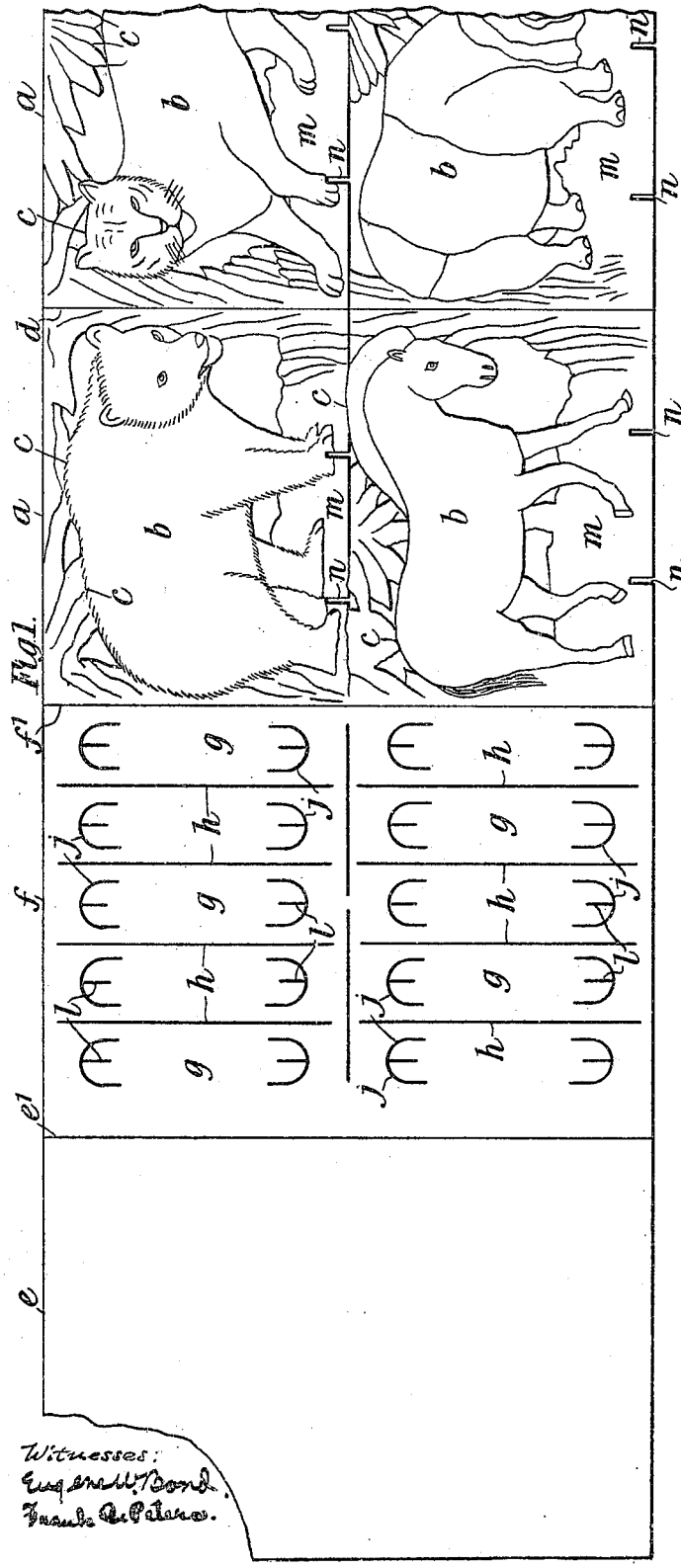
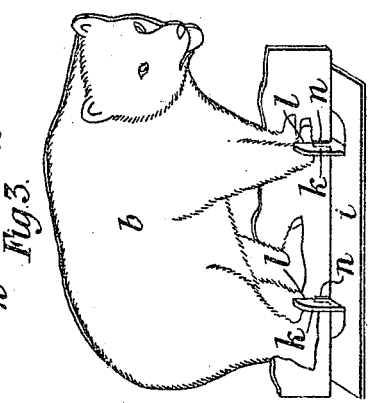
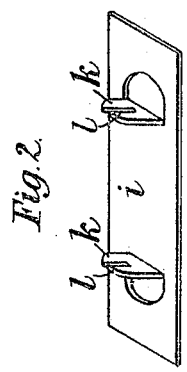
Witnesses:
Eugene W. Bond
Frank A. Peters
Inventor:
Gustave Tuck
by Arthur S. Browne
his attorney

G. TUCK.
TOY OR PICTURE BOOK.
APPLICATION FILED JAN. 9, 1909.

959,655.

Patented May 31, 1910.
2 SHEETS—SHEET 2.

WITNESSES

INVENTOR
Gustave Tuck
by Arthur T. Browne
His Attorney

UNITED STATES PATENT OFFICE.

GUSTAVE TUCK, OF MOORFIELDS, LONDON, ENGLAND.

TOY OR PICTURE BOOK.

959,655.      Specification of Letters Patent.      Patented May 31, 1910.

Application filed January 9, 1909. Serial No. 471,437.

*To all whom it may concern:*

Be it known that I, GUSTAVE TUCK, a subject of the King of Great Britain, resident of Raphael House, Moorfields, in the city of London, England, have invented new and useful Improvements in Toy or Picture Books, of which the following is a specification.

This invention relates to toy or picture books and has for its object to enable the pictorial objects contained therein to be readily detached from the book and built up or arranged independently for educational purposes or amusement and each figure and object in each panorama is arranged to stand separately, the combined figures forming an endless variety of tableaux.

According to the invention some of the leaves of the book are printed on one or on both sides to represent opposite sides of the pictorial object or objects the material around the profile of the said objects being cut away in parts leaving them attached only at points to the said leaves so that the person using the book can remove them therefrom without any special exercise or skill, it merely being necessary to sever these points of connection. To enable the pictorial objects to stand vertically on a table or the like when detached from the book, the latter is provided with a leaf or leaves on the cover or a part thereof divided by lines into sections of polygonal or other shapes which lines are cut through to detach the said sections from the book to form stands. The material, preferably cardboard, of the said sections or stands is slit or cut through so that the material between such cuts can be bent up to form lugs having slits with which the bases of the pictorial objects can engage, the objects being advantageously provided with corresponding slits to engage the slits of the said lugs. In some cases the pictorial objects may be slit or otherwise formed so that they can be engaged together. The leaves provided with the pictorial objects may each be hinged or attached to the cover; or the series of leaves may be connected and folded together, one end of the series being attached to the cover.

In order that the invention can be clearly understood reference is had to the annexed drawing, in which—

Figure 1 is a view of a portion of a toy or picture book made according to the invention, the leaves thereof being extended or opened out. Fig. 2 is a perspective view of one of the stands when separated from the book with its parts in position to receive a figure or object. Fig. 3 is a perspective view showing a figure or object supported on the stand. Fig. 4 is a perspective view of a book in folded form made in accordance with the present invention, wherein the series of leaves are connected and folded together, and one end of the series is attached to the cover.

$a, a$ Fig. 1, are the leaves of the book and $b, b$ indicate the pictorial objects or figures printed on the said leaves, the material around the profiles of the objects being cut away in parts leaving them attached together and to the edges of the leaves at the points $c, c$. By cutting through the material of the leaves at these points the figures will be separated from one another and from the leaves. In the drawing the leaves are made in one continuous strip designed to be folded together along the lines $d, d$ so that they can be placed between the two sides $e, f$ of the cover which fold together at the line $e^1$, one end of the strip being joined to the side $f$ at the line $f^1$ and designed to fold along the said line. Instead of the leaves being made in one strip, they may be separate and arranged within and connected to the cover in book form.

$g, g$ are the sections formed by the lines or cuts $h, h$ on the side $f$ of the cover, or on one of the leaves, and which, when the material at the ends of the said lines is cut through, form stands $i, i$ Figs. 2 and 3 for supporting the pictorial objects $b, b$ in an upright position on a table or other surface.

$j, j$ are the slits in the stands, the material inclosed by which can be bent up to form lugs $k, k$ and $l, l$ are the slits formed in the said lugs with which the bases $m, m$ of the pictorial objects can be engaged as indicated clearly in Figs. 3, $n, n$ being the slits in the said bases which engage with the lugs and maintain the latter upright.

In addition to the leaves $a$ and $f$, I preferably attach between the sides of the cover one or more leaves of printed matter setting forth information relative to the pictorial objects.

By my invention, a toy or picture book is produced which can be used for educational purposes or amusement, the pictorial objects, for instance, being those of animals or the like characters of a fairy tale or nursery rhyme, which objects when detached from the book can be effectively grouped thereby increasing the interest of the user.

I claim:—

A toy or picture book in which a portion is printed or illustrated with pictorial objects, each object being formed with slits at its base, and another portion of the book being divided into sections which constitute stands for the objects when detached, each stand having lugs formed by bending up partially severed portions thereof, and each lug having a slit, the respective slits on the objects and stands enabling them to mutually engage each other.

GUSTAVE TUCK.

Witnesses:
A. NUTTING,
P. PHILLIPPS.